(12) United States Patent
Hostetter et al.

(10) Patent No.: US 11,938,533 B2
(45) Date of Patent: Mar. 26, 2024

(54) BI-METAL VALVE BODY CASTING AND METHOD OF MAKING SAME

(71) Applicant: FISHER CONTROLS INTERNATIONAL LLC, Marshalltown, IA (US)

(72) Inventors: Steven K. Hostetter, Colfax, IA (US); Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 211 days.

(21) Appl. No.: 17/392,730

(22) Filed: Aug. 3, 2021

(65) Prior Publication Data
US 2021/0362218 A1    Nov. 25, 2021

Related U.S. Application Data

(62) Division of application No. 15/721,628, filed on Sep. 29, 2017, now Pat. No. 11,090,713.

(51) Int. Cl.
| | |
|---|---|
| *B22D 19/04* | (2006.01) |
| *B22C 9/10* | (2006.01) |
| *B22D 11/00* | (2006.01) |
| *B22D 19/08* | (2006.01) |
| *B22D 19/16* | (2006.01) |
| *F16K 1/42* | (2006.01) |
| *F16K 1/46* | (2006.01) |
| *F16K 25/00* | (2006.01) |

(Continued)

(52) U.S. Cl.
CPC ............ *B22D 11/001* (2013.01); *B22D 19/08* (2013.01); *B22D 19/16* (2013.01); *F16K 1/42* (2013.01); *F16K 1/46* (2013.01); *F16K 25/005* (2013.01); *F16K 27/00* (2013.01); *F16K 27/02* (2013.01); *F16K 5/0221* (2013.01)

(58) Field of Classification Search
CPC ......... B22C 9/103; B22C 9/108; B22D 19/02; B22D 19/04; B22D 19/08; B22D 19/16
USPC .................... 164/47, 132, 137, 369, 98, 112
See application file for complete search history.

(56) References Cited

U.S. PATENT DOCUMENTS

| | | | |
|---|---|---|---|
| 2,221,921 | A | 11/1940 | Beau |
| 3,506,242 | A | 4/1970 | Aunspach |

(Continued)

FOREIGN PATENT DOCUMENTS

| | | |
|---|---|---|
| CN | 204533591 U | 8/2015 |
| FR | 2596487 A1 | 10/1987 |
| JP | H09144924 A | 6/1997 |

OTHER PUBLICATIONS

Search Report for International application No. PCT/US2018/050692, dated Nov. 19, 2018.

(Continued)

*Primary Examiner* — Kevin P Kerns
(74) *Attorney, Agent, or Firm* — MARSHALL, GERSTEIN & BORUN LLP

(57) ABSTRACT

A valve body having a ring of dissimilar material and a method of forming the valve body are described. The valve body includes an inlet, an outlet and a ring of dissimilar material. The method includes forming a valve core, splitting the valve core, placing a metal ring of dissimilar material between two pieces of the valve core, casting a valve body around the valve core, and fusing the metal ring to the valve body.

20 Claims, 4 Drawing Sheets

(51) Int. Cl.
    *F16K 27/00*           (2006.01)
    *F16K 27/02*           (2006.01)
    *F16K 5/02*            (2006.01)

(56) References Cited

U.S. PATENT DOCUMENTS

| | | |
|---|---|---|
| 4,441,689 A | 4/1984 | Kato |
| 5,064,169 A | 11/1991 | Alberts et al. |
| 7,070,166 B1 | 7/2006 | Blume |
| 7,954,788 B2 | 6/2011 | Davies, Jr. et al. |
| 11,090,713 B2 * | 8/2021 | Hostetter et al. ...... B22D 19/08 |
| 2007/0215834 A1 | 9/2007 | Helfer et al. |
| 2011/0297255 A1 | 12/2011 | Weingarten |

OTHER PUBLICATIONS

Written Opinion for International application No. PCT/US2018/050692, dated Nov. 19, 2018.
Federal Steel Supply, Inc.; The Carbon Steel Advantage; Jul. 21, 2014 http://www.fedsteel.com/our-blog/carbon-steel-advantage/ (Year: 2014).

\* cited by examiner

BI-METAL VALVE BODY CASTING AND METHOD OF MAKING SAME

CROSS-REFERENCE TO RELATED APPLICATION

This application is a divisional of U.S. patent application Ser. No. 15/721,628, now U.S. Pat. No. 11,090,713, entitled "Bi-Metal Valve Body Casting and Method of Making Same," and filed Sep. 29, 2017, the entire disclosure of which is hereby incorporated by reference herein.

FIELD OF THE INVENTION

The disclosure is related to valve bodies for control valves, and is more specifically related to valve bodies having a ring of dissimilar material fused in the valve port.

BACKGROUND

In many control valve applications, and particularly in control valve applications involving severe service conditions, the internal components of the control valve may be subject to severe service conditions that may cause, for example, possible flashing, cavitation, and particles, all of which can potentially cause severe erosion, corrosion, and/or vibration. Consequently, such valves are often provided with inserts or other shielding components that are more corrosion resistant than the valve body itself.

In construction of such valve components, the insert may be attached to a valve body component using a shrink fit procedure or the insert may be attached to the valve body component with a mechanical stop. Shrink fitting can cause stress risers to formed at the juncture between the insert and the underlying base. Such stress risers can and sometimes do contribute to premature failure of the insert by contributing to the formation and/or propagation of cracks in the insert. Furthermore, temperature changes can cause the metal retainers to expand, thereby reducing the effectiveness of the insert. Mechanical stops, such as snap rings may become unreliable during severe service conditions.

DETAILED DESCRIPTION

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

Figure 1:
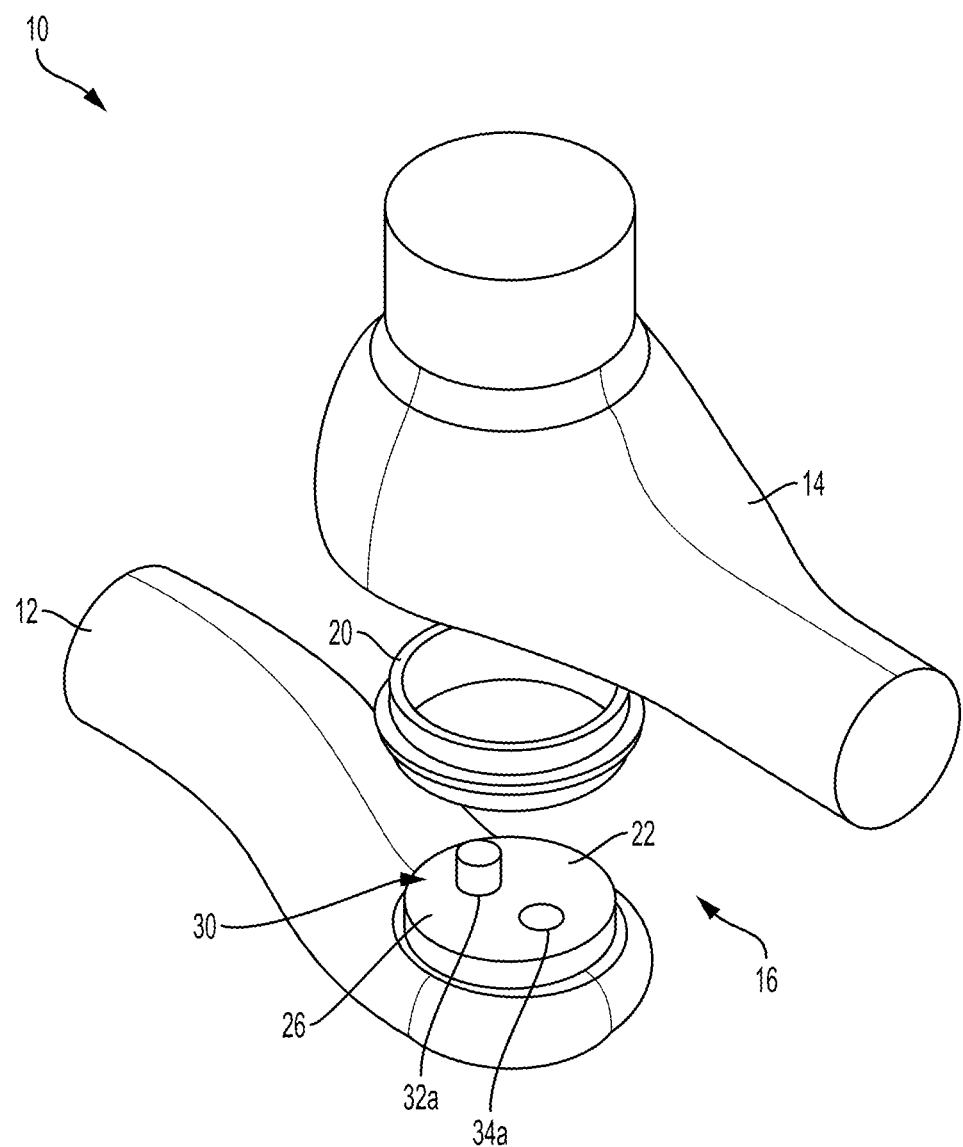
FIG. 1 is a top exploded perspective view of a casting core and a metal port ring.
Figure 2:
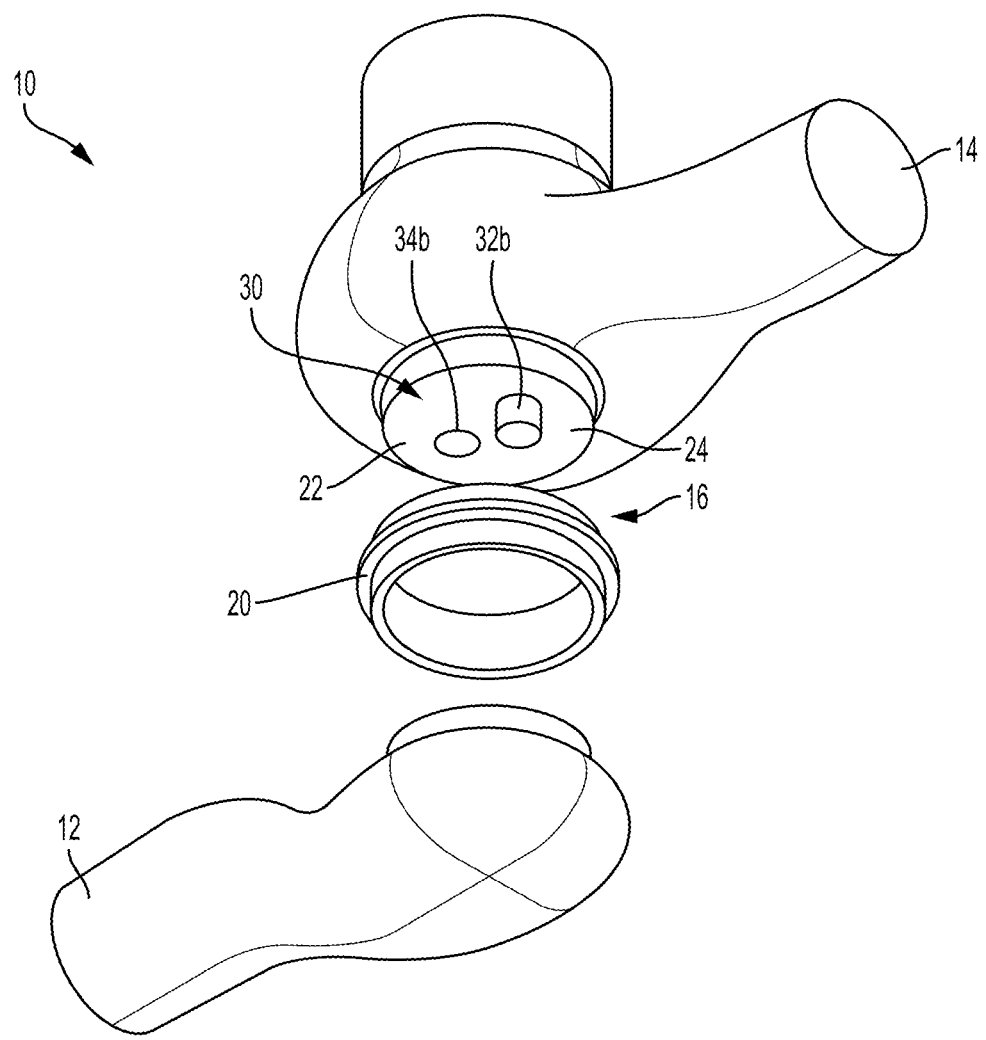
FIG. 2 is a bottom exploded perspective view of the casting core and metal port ring of FIG. 1.
Figure 3:
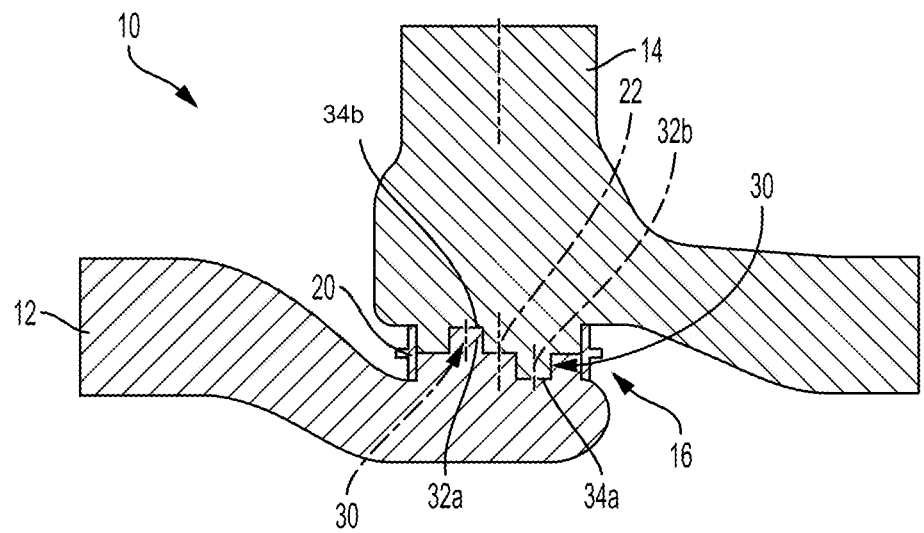
FIG. 3 is a side cross-sectional view of the casting core and metal port ring of FIG. 1, the top and bottom core portions being connected.

Turning now to FIGS. 1-3, a method of forming a valve body having an area of dissimilar material fused therein is described. The method includes forming a valve core 10 that has an inlet section 12 and an outlet section 14 that are connected by a port section 16. The valve core 10 forms the void in the finished valve body, as described below. In other words, the valve core 10 is a solid structure that prevents valve body material from penetrating the area bounded by the valve core 10 during final casting, thus forming an inlet, an outlet, and a fluid passageway through the finished valve body. In other embodiments, the inlet section 12 and the outlet section 14 may be reversed. In some embodiments, the valve core 10 may be formed by sand casting.

The valve core 10 is split into a first core part or the inlet section 12 and a second core part or the outlet section 14 and a metal port ring or metal ring 20 is placed between the inlet section 12 and the outlet section 14. The valve core 10 may be split along a mid-line 22 of the port section 16, thereby forming an upper port surface 24 and a lower port surface 26.

An alignment structure 30 may be formed on the inlet section 12 and on the outlet section 14. More specifically, the alignment structure 30 may be formed on the upper port surface 24 and on the lower port surface 26. The alignment structure 30 ensures proper alignment between the inlet section 12 and the outlet section 14 when the inlet section 12 and the outlet section 14 are rejoined prior to casting the valve body. In the illustrated embodiment, the alignment structure 30 comprises at least one post and at least one hole. More specifically, a first post 32 *a* and a first hole 34 *a* are formed on the lower port surface 26 and a second post 32 *b* and a second hole 34 *b* are formed on the upper port surface 24.

The metal ring 20 may be formed from a wrought material, such as Alloy 6 or 410 SST. In any event, the metal ring 20 is formed from a metal that is dissimilar from the metal that will form the valve body. The metal ring 20 is placed between the upper port surface 24 and the lower port surface 26.

Thereafter, the inlet section 12 and the outlet section 14 are brought together with the metal ring 20 surrounding the port section 16 to form the valve core 10 with the metal ring 20, as illustrated in FIG. 3.

Figure 4:
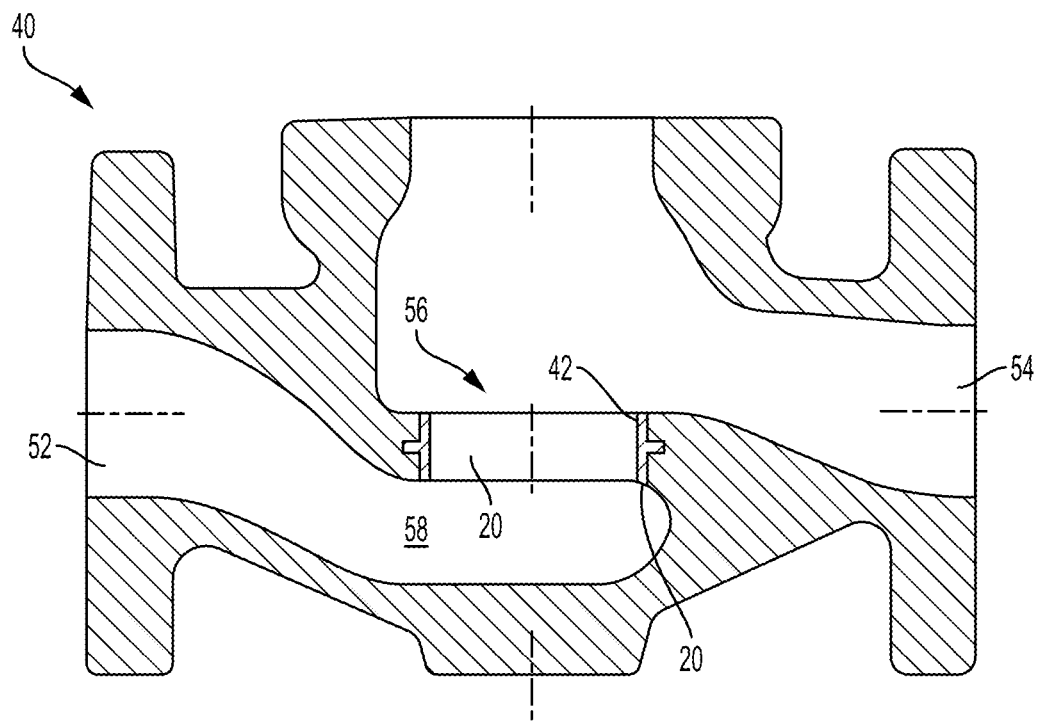
FIG. 4 is a cross-sectional view of a valve housing produced by the casting core and metal port ring of FIG. 1.

The valve core 10 and the metal ring 20 are then placed in a casting pattern, which is not illustrated in the figures, but is generally understood in the art, and an illustration of the casting pattern is not needed to understand the invention. The casting pattern is filled with valve body material to form a valve body 40, as illustrated in FIG. 4. During the casting process, the metal ring 20 is heated by the valve body material so that the metal ring 20 is fused with the valve body material by partially melting the metal ring 20, thereby allowing the metal ring material to fuse with the valve body material. In some embodiments the valve body material is carbon steel. After the casting pattern is filled with the valve body material, the valve body 40 is cooled, and the valve core 10 is removed, leaving the valve body 40 with the fused metal ring 20.

In some embodiments, a plug seat or seat 42 may be machined into the metal ring 20.

The valve body 12 includes a fluid inlet 52 and a fluid outlet 54 connected by a fluid passageway 58. The fluid inlet 52 generally corresponds to the shape of the inlet portion 12 of the valve core 10. Similarly, the fluid outlet 54 generally corresponds to the shape of the outlet portion 14 of the valve core 10. A valve port 56 is formed in the fluid passageway 58, the valve port 56 generally corresponding to the shape of the port section 16 of the valve core 10.

The metal ring 20 is disposed in the fluid passageway 58 and is fused with the valve body 40. In the illustrated embodiment, the metal ring 20 is fused in the valve port 56. However, in other embodiments, the metal ring 20 may be fused in other portions of the fluid passageway 58, such as below the valve port 56, or in other locations.

Figure 5:
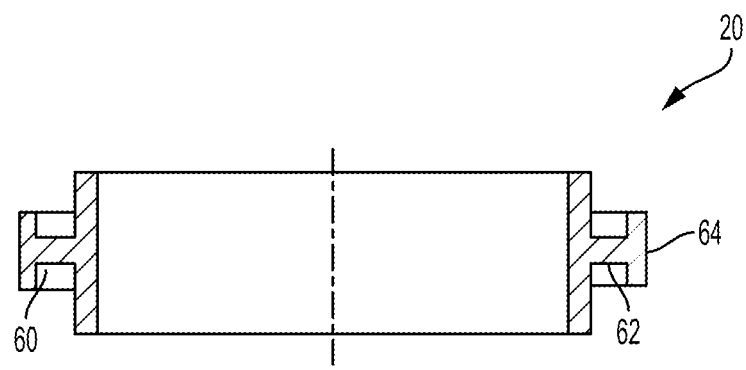
FIG. 5 is a cross-sectional view of a first embodiment of the metal port ring of FIG. 1.
Figure 6:
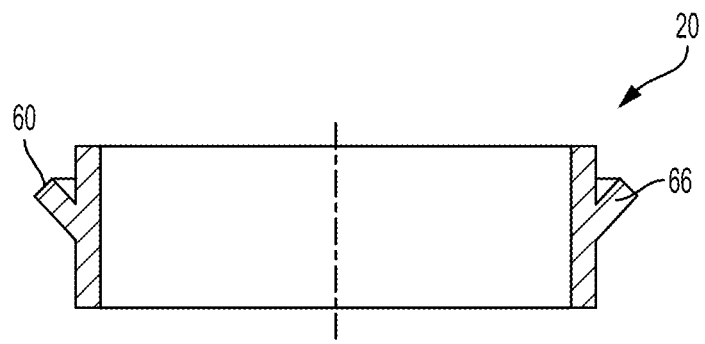
FIG. 6 is a cross-sectional view of a second embodiment of the metal port ring of FIG. 1.

Turning now to FIGS. 5 and 6, the metal ring 20 may include a bonding structure 60 to enhance fusing of the metal ring 20 to the valve body 40. In the embodiment of FIG. 5, the bonding structure 60 takes the form of an annular shelf 62 and wall 64. The annular shelf 62 may project radially from an outer surface of the metal ring 20 and the wall 64 may be oriented perpendicular to the annular shelf 62.

In the embodiment of FIG. 6, the bonding structure may take the form of a cone-shaped band 66 that is angled, non-parallel and non-perpendicular, relative to the outer surface of the metal ring 20.

While the corrosion resistant ring of material has been described herein as a metal port ring, which is located in a valve port section of a valve body, in other embodiments a ring of corrosion resistant material may be cast into other sections of the valve body using similar techniques to those described herein.

The valve bodies and methods of forming valve bodies described herein are applicable to virtually any type of control valve. For example, the valve bodies and method may be used to form valve bodies for sliding stem valves, globe valves, rotary valves, sliding gate valves, or any other type of control valve.

The bi-metal valve bodies described herein advantageously reduce the cost of corrosion resistant valve bodies by using corrosion resistant materials only in targeted locations of the valve body, rather than casting the entire valve body out of the corrosion resistant material. Further, the corrosion resistant port ring may be produced from wrought material, which has fewer defects than cast material. As a result, a relatively defect free surface is created, which can enhance sealing of cartridge trim having a radial seal. Still further, the valve port ring may function as a seat ring, thus removing the need for a separate seat ring. Finally, casting the valve port ring directly into the valve body is more cost effective than other methods of fixing corrosion resistant material to a valve body.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A method of forming a valve body having an area of dissimilar material fused therein, the method comprising:
   forming a valve core, the valve core having an inlet section and an outlet section that are connected by a port section;
   splitting the valve core into a first core part and a second core part;
   placing a metal ring between the first core part and the second core part;
   joining the first core part and the second core part together to form the valve core with the metal ring;
   placing the valve core in a casting pattern;
   filling the casting pattern with valve body material to form a valve body;
   fusing the metal ring with the valve body material during the filling of the casting pattern by partially melting the metal ring, thereby allowing the metal ring material to fuse with the valve body material;
   cooling the valve body material; and
   removing the valve core,
   wherein the first core part includes a first alignment structure and the second core part includes a second alignment structure that engages the first alignment structure when the first core part and the second core part are joined together,
   wherein the first alignment structure comprises a first post and a first hole disposed on the first core part, and
   wherein the second alignment structure comprises a second post and a second hole disposed on the second core part.

2. The method of claim 1, wherein splitting the valve core into a first core part and a second core part comprises splitting the valve core along a port mid-line of the port section.

3. The method of claim 2, wherein the step of placing the metal ring between the first core part and the second core part comprises placing the metal ring around the port section.

4. The method of claim 3, wherein the first alignment structure is formed on an upper port surface of the port section and the second alignment structure is formed on a lower port surface of the port section opposite the upper port surface, and wherein the metal ring is placed into engagement with both the upper port surface and the lower port surface.

5. The method of claim 1, further comprising forming the first alignment structure on the first core part and forming the second alignment structure on the second core part.

6. The method of claim 1, wherein the first post is disposed in the second hole and the second post is disposed in the first hole when the first core part and the second core part are joined together.

7. The method of claim 1, further comprising forming the metal ring from a wrought material.

8. The method of claim 1, wherein filling the casting pattern with valve body material to form a valve body comprises filling the casting pattern with carbon steel.

9. The method of claim 1, further comprising machining a ring seat into the metal ring.

10. The method of claim 1, wherein the valve core is formed by sand casting.

11. A method of forming a valve body having an area of dissimilar material fused therein, the method comprising:
    obtaining a valve core, the valve core having a first core part and a second core part split from the first core part, the first core part configured to define a fluid inlet of a valve body and the second core part configured to define a fluid outlet of the valve body;
    placing a ring made of a first material between the first core part and the second core part;
    joining the first core part and the second core part together to form the valve core with the ring;
    placing the valve core in a casting pattern;
    filling the casting pattern with a second material to form the valve body, the valve body comprising the fluid inlet and the fluid outlet;

fusing the ring with the valve body during the filling of the casting pattern by partially melting the ring, thereby allowing the first material to fuse with the second material;

cooling the second material; and removing the valve core, wherein the first core part includes a first alignment structure and the second core part includes a second alignment structure that engages the first alignment structure when the first core part and the second core part are joined together.

12. The method of claim 11, wherein obtaining the valve core comprises:

forming the valve core, wherein the first core part is connected to the second core part by a port section; and then splitting the first core part from the second core part.

13. The method of claim 11, further comprising forming the first alignment structure on the first core part and forming the second alignment structure on the second core part.

14. The method of claim 11, wherein the first alignment structure comprises at least one first post and at least one first hole.

15. The method of claim 14, wherein the first alignment structure comprises a first post and a first hole disposed on the first core part, and the second alignment structure comprises a second post and a second hole disposed on the second core part, wherein the first post is disposed in the second hole and the second post is disposed in the first hole when the first core part and the second core part are joined together.

16. The method of claim 11, wherein the first material comprises a corrosion-resistant material.

17. The method of claim 11, wherein the second material comprises carbon steel.

18. The method of claim 11, wherein the valve body comprises a fluid passageway connecting the fluid inlet and the fluid outlet, wherein the ring is fused to the valve body in the fluid passageway.

19. The method of claim 11, wherein the ring has a bonding structure configured to enhance fusing of the ring to the valve body.

20. The method of claim 19, wherein the bonding structure comprises: (1) an annular shelf and a wall extending radially outward from the annular shelf, or (2) a cone-shaped band.

* * * * *